United States Patent
Sandberg

(10) Patent No.: US 12,484,054 B2
(45) Date of Patent: Nov. 25, 2025

(54) DUAL BASE STATION FRAME BOUNDARIES

(71) Applicant: Outdoor Wireless Networks LLC, Richardson, TX (US)

(72) Inventor: Stuart D. Sandberg, Acton, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 377 days.

(21) Appl. No.: 18/323,888

(22) Filed: May 25, 2023

(65) Prior Publication Data

US 2023/0389015 A1    Nov. 30, 2023

Related U.S. Application Data

(60) Provisional application No. 63/346,201, filed on May 26, 2022.

(51) Int. Cl.
   *H04W 72/1268*   (2023.01)
   *H04W 72/543*    (2023.01)
   *H04W 74/0833*   (2024.01)

(52) U.S. Cl.
   CPC ..... *H04W 72/1268* (2013.01); *H04W 72/543* (2023.01); *H04W 74/0833* (2013.01)

(58) Field of Classification Search
   None
   See application file for complete search history.

(56) References Cited

U.S. PATENT DOCUMENTS

| | | |
|---|---|---|
| 8,477,698 B2 | 7/2013 | Lee et al. |
| 10,757,664 B2 | 8/2020 | Bhorkar et al. |
| 2013/0250925 A1 | 9/2013 | Löhr et al. |
| 2017/0290008 A1 | 10/2017 | Tooher et al. |
| 2019/0036668 A1* | 1/2019 | Guan ............ H04W 72/21 |

(Continued)

FOREIGN PATENT DOCUMENTS

WO    2022015019 A1    1/2022

OTHER PUBLICATIONS

International Searching Authority, "International Search Report and Written Opinion", from PCT Application No. PCT/US2023/023572, from Foreign Counterpart to U.S. Appl. No. 18/323,888, filed Sep. 7, 2023, pp. 1 through 9, Published in: WO.

*Primary Examiner* — Saumit Shah
(74) *Attorney, Agent, or Firm* — Fogg & Powers LLC

(57) ABSTRACT

A communication system that uses dual base station frame boundaries is provided. A base station is in communication with a core network of at least one service provider and user equipment. The base station includes a circuitry that is configured to set a UL physical uplink shared channel (PUSCH) time frame boundary in alignment with a downlink (DL) PDSCH time frame boundary, process PUSCH communication signals in the PUSCH using the UL PUSCH time frame boundary, set an UL random access channel (RACH) time frame boundary at a select delay from an associated RACH time frame boundary within a UL PUSCH time frame, process RACH communication signals using the delayed UL RACH time frame boundary, and provide a timing advance command to a UE that communicated a UL RACH communication signal that accounts for a round trip latency in a fronthaul network connecting the base station and radio units.

20 Claims, 4 Drawing Sheets

(56) References Cited

U.S. PATENT DOCUMENTS

| | | |
|---|---|---|
| 2019/0132838 A1* | 5/2019 | Yi ........................ H04L 5/0055 |
| 2019/0327736 A1 | 10/2019 | Takeda et al. |
| 2021/0153193 A1 | 5/2021 | Lin |
| 2021/0314889 A1* | 10/2021 | Rico Alvarino .. H04W 56/0005 |
| 2022/0124658 A1* | 4/2022 | Beale .................... H04W 24/10 |
| 2023/0300888 A1* | 9/2023 | Lee ................... H04W 74/0833 |
| | | 370/329 |

* cited by examiner

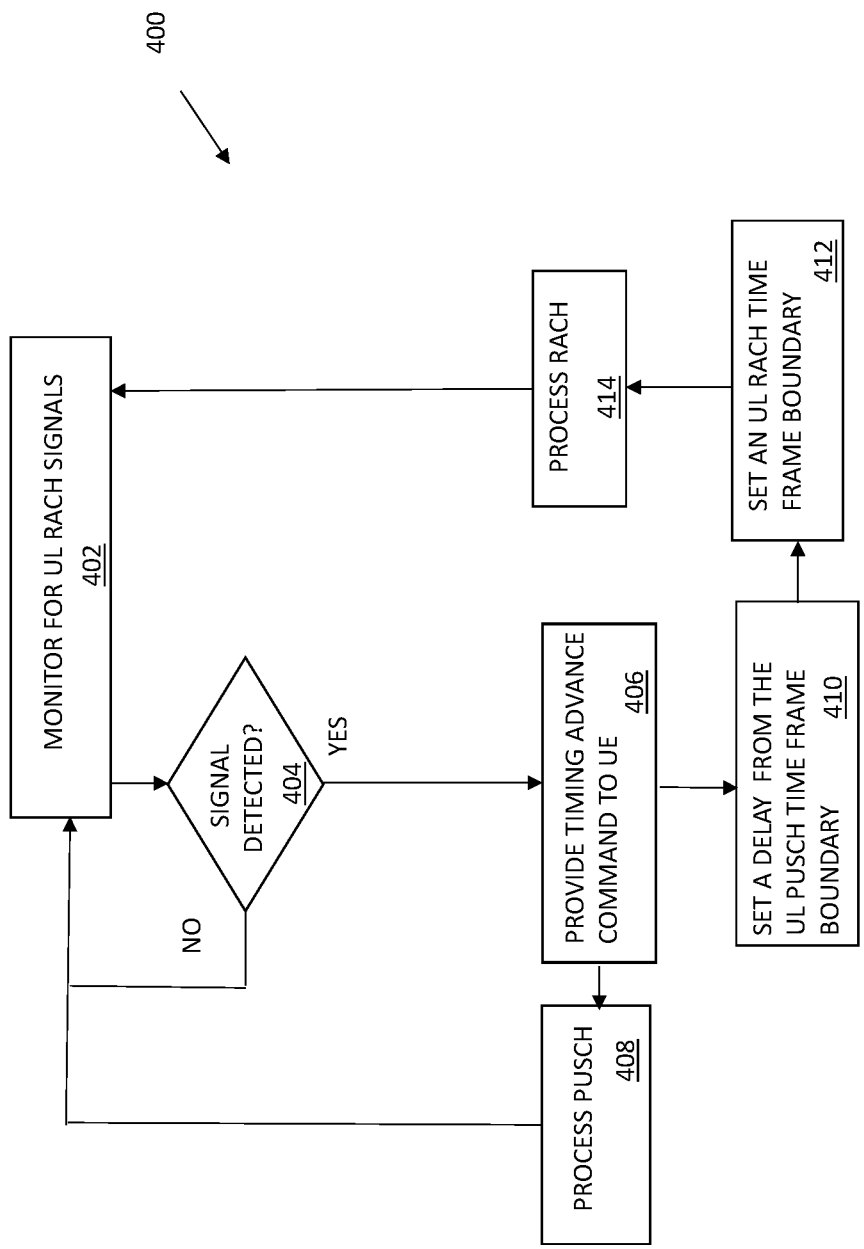

DUAL BASE STATION FRAME BOUNDARIES

CROSS-REFERENCE TO RELATED APPLICATIONS

This application claims priority to U.S. Provisional Application Ser. No. 63/346,201, same title herewith, filed on May 26, 2022, which is incorporated in its entirety herein by reference.

BACKGROUND

Wireless cellular service providers use base stations to implement wireless communication links with user equipment, such as mobile phones. In particular, a base station is typically in communication with one or more antennas that receive and transmit radio frequency signals to and from user equipment. Each base station in turn is in communication with the service provider's core network. The coverage area of a base station is limited by the transmit power of the associated signals. Moreover, the coverage provided by the transmitted signals is influenced by many other factors such as physical obstacles and interference. Hence, wireless coverage in buildings and stadiums has been traditionally poor when served only from conventional "macro" base stations. One way that a wireless cellular service provider can improve the coverage provided by a given base station or group of base stations is by using a distributed antenna system (DAS).

To increase throughput, a base station may share a communication channel among wireless devices. For example, a random access channel (RACH) may be shared among wireless devices. Switched Ethernet may be used to control the passing of information between the base station and the antennas. In a system that implements RACH, when user equipment (UE) wants to make a mobile originating call, the UE schedules its use of the RACH. The UE connects to a cellular network by using a RACH procedure which includes listening to a broadcast channel that provides synchronization information, implementing synchronization to the cellular network, and configuring itself for the collection of RACH preambles and RACH opportunities supported by the base station. Once synchronization occurs, the UE picks a preamble at random and then tries to access the RACH by transmitting the preamble. The base station in this system listens at every UL RACH opportunity to see if any UEs are transmitting a preamble.

For the communication system to provide a desired quality of service (QoS), latencies encountered as signals are communicated between bases stations and user UEs must be effectively dealt with within the system. When a wireless base station (gNB) uses a single UL ethernet frame boundary for RACH and other channels (e.g., physical uplink shared channel (PUSCH)), any latency between the base station and the access point (AP)/remote unit (RU) antennas must be accounted for when selecting a zero-correlation zone (ZCZ) configuration and corresponding time $T_{cs}$ between RACH cyclic shifts (preambles). The roundtrip latency plus the roundtrip over-the-air (OTA) latency must not exceed $T_{cs}$ in order to have reliable RACH performance with accurate determination of the UE's preamble selection. The requirement for $T_{cs}$ is thus relatively large when latency is relatively large, requiring a relatively large number of root-sequences per RACH opportunity. Implementation complexity increases and RACH performance generally degrades, as the number of root-sequences increases. Furthermore, fiber reach to the RU (which contributes to latency) is limited, depending on the resolution available with $T_{cs}$ and the ZCZ configuration options.

For the reasons stated above and for other reasons stated below which will become apparent to those skilled in the art upon reading and understanding the present specification, there is a need in the art for a system to make RACH QoS independent of the latency.

SUMMARY OF INVENTION

The following summary is made by way of example and not by way of limitation. It is merely provided to aid the reader in understanding some of the aspects of the subject matter described. Embodiments provide a communication system that provides dual boundary processing that processes RACH independently from PUSCH and other channels at the base station.

In one embodiment, a method of operating a communication system with dual base station frame boundaries is provided. The method includes setting an uplink (UL) physical uplink shared channel (PUSCH) time frame boundary at a base station aligned with a downlink (DL) physical downlink shared channel (PDSCH) time frame boundary; processing PUSCH communication signals in the PUSCH based on the UL PUSCH time frame boundary; setting an UL random access channel (RACH) time frame boundary at a select delay from an associated RACH time frame boundary within a UL PUSCH time frame; processing RACH communication signals based on the delayed UL RACH time frame boundary, wherein the processing of RACH communication signals is independent of the processing of PUSCH communication signals; and providing a timing advance command to a user equipment (UE) that communicated a UL RACH communication signal that accounts for a round trip latency so subsequent UL communications from the UE will be aligned with the UL PUSCH time frame boundary.

In another embodiment, a program process comprising a non-transitory processor-readable medium on which program instructions configured to be executed by at least one communication controller are provided. When the program instructions are executed by the communication controller, the program instructions cause the communication controller to: set an UL physical uplink shared channel (PUSCH) time frame boundary at a base station aligned with a downlink (DL) physical downlink shared channel (PDSCH) time frame boundary; process PUSCH communication signals in the PUSCH based on the UL PUSCH time frame boundary; set an UL RACH time frame boundary at a select delay from an associated RACH time frame boundary within a UL PUSCH time frame, wherein the select delay is based on a round trip latency through a fronthaul of a communication system connecting a base station with antennas; and process RACH communication signals based on the delayed UL RACH time frame boundary, wherein the processing RACH communication signals is independent of the processing PUSCH communication signals; and upon detection of a RACH preamble, provide a timing advance command to user equipment (UE) that communicated the UL RACH communication signal that accounts for a round trip latency so subsequent UL communications from the UE will be aligned with the UL PUSCH time frame boundary.

In yet another embodiment, a base station of a communication system that uses dual base station frame boundaries is provided. The base station includes circuitry configured to wirelessly communicate with user equipment (UE). The circuitry is configured to: set an UL physical uplink shared channel (PUSCH) time frame boundary at a base station aligned with a downlink (DL) physical downlink shared channel (PDSCH) time frame boundary; process PUSCH communication signals in the PUSCH using the UL PUSCH time frame boundary; set an UL random access channel (RACH) time frame boundary at a select delay from the UL PUSCH time frame boundary; process RACH communication signals using the delayed UL RACH time frame boundary, wherein the processing RACH communication signals is independent of the processing PUSCH communication signal; and upon detection of a RACH preamble, provide a timing advance command to a UE that communicated the UL RACH communication signal that accounts for a round trip latency so subsequent UL communications from the UE will be aligned with the UL PUSCH time frame boundary.

BRIEF DESCRIPTION OF THE DRAWINGS

The present invention can be more easily understood and further advantages and uses thereof will be more readily apparent, when considered in view of the detailed description and the following figures in which:

FIG. 4 is communication flow diagram according to an example aspect of the present invention.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention mitigate latency while maintaining QoS by processing the RACH independently from PUSCH and other channels at the base station. The base station uses a frame boundary for RACH which is separate and delayed from the boundary from the PUSCH. As discussed below in detail, in an example embodiment, a select delay $D_{rach}$ for a RACH boundary is set equal to a roundtrip latency between the base station and the remote antenna units. When this occurs, the requirement of $T_{cs}$ is no longer dependent on that latency and is only driven by over the air (OTA) propagation time. Thus, the use of dual boundary processing reduces the required number of root-sequences. This also generally increases permissible fiber reach, which is no longer limited by the resolution available for $T_{cs}$.

Figure 1:
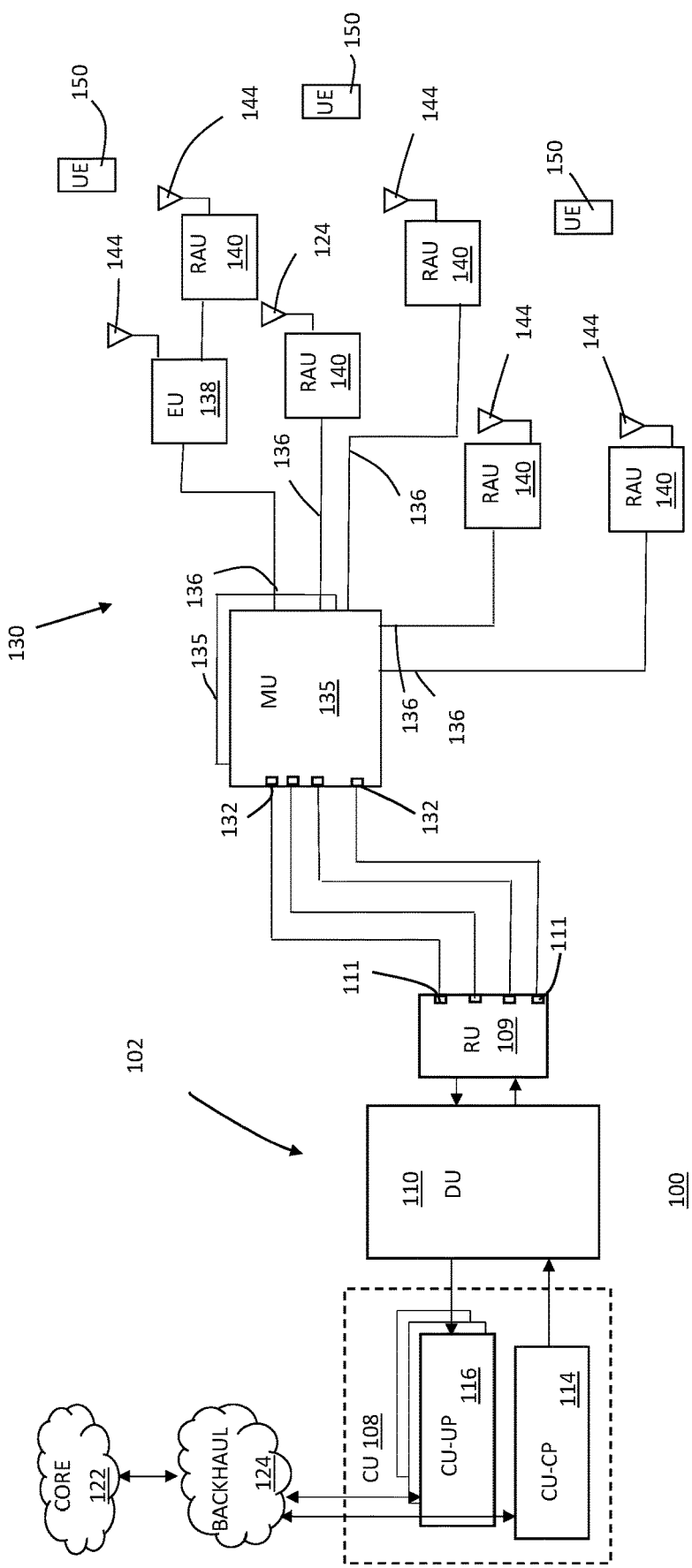
FIG. 1 is a block diagram of a radio access network communication system according to an example aspect of the preset invention.

FIG. 1 is a block diagram illustrating one exemplary embodiment of a radio access network (RAN) communication system 100 in which the dual frame boundary techniques described below are implemented.

The communication system 100 shown in FIG. 1 implements at least one base station entity 102 to serve a cell. Each such base station entity 102 can also be referred to here as a "base station" or "base station system" (and, which in the context of a fourth generation (4G) Long Term Evolution (LTE) system, may also be referred to as an "evolved NodeB", "eNodeB", or "eNB" and, in the context of a fifth generation (5G) New Radio (NR) system, may also be referred to as a "gNodeB" or "gNB").

In general, each base station 102 is configured to provide wireless service to various items of user equipment (UEs) 150 served by an associated cell. Unless explicitly stated to the contrary, references to Layer 1, Layer 2, Layer 3, and other or equivalent layers (such as the Physical Layer or the Media Access Control (MAC) Layer) refer to layers of the particular wireless interface (for example, 4G LTE or 5G NR) used for wirelessly communicating with UEs 150. Furthermore, it is also to be understood that 5G NR embodiments can be used in both standalone and non-standalone modes (or other modes developed in the future) and the following description is not intended to be limited to any particular mode. Moreover, although some embodiments are described here as being implemented for use with 5G NR, other embodiments can be implemented for use with other wireless interfaces and the following description is not intended to be limited to any particular wireless interface.

In the specific exemplary embodiment shown in FIG. 1, each base station 102 is implemented as a respective 5G NR gNB 102 (only one of which is shown in FIG. 1 for ease of illustration). In this embodiment, each gNB 102 is partitioned into one or more central unit entities (CUs) 108, one or more distributed unit entities (DUs) 110, and one or more radio units (RUs) 109. In such a configuration, each CU 108 implements Layer 3 and non-time critical Layer 2 functions for the gNB 102. In the embodiment shown in FIG. 1, each CU 108 is further partitioned into one or more control-plane entities 114 and one or more user-plane entities 116 that handle the control-plane and user-plane processing of the CU 108, respectively. Each such control-plane CU entity 114 is also referred to as a "CU-CP" 114, and each such user-plane CU entity 116 is also referred to as a "CU-UP" 116. Also, in such a configuration, each DU 110 is configured to implement the time critical Layer 2 functions and, except as described below, at least some of the Layer 1 functions for the gNB 102. In this example, each RU 109 is configured to implement the physical layer functions for the gNB 102 that are not implemented in the DU 110 as well as the RF interface. Also, each RU 109 includes a plurality of antenna ports 111

Each RU 108 is communicatively coupled to the DU 110 serving it (for example, using a switched Ethernet network, in which case each RU 108 and each physical node on which each DU 110 is implemented includes one or more Ethernet network interfaces to couple each RU 109 and each DU physical node to the switched Ethernet network in order to facilitate communications between the DU 110 and the RUs 109). In one implementation, a fronthaul interface promulgated by the O-RAN alliance is used for communication between the DU 110 and the RUs 109. In another implementation, a proprietary fronthaul interface that uses a so-called "functional split 7-2" for at least some of the physical channels (for example, for the PDSCH and PUSCH) and a different functional split for at last some of the other physical channels (for example, using a functional split 6 for the PRACH and SRS).

In such an example, each CU 108 is configured to communicate with a core network 122 of the associated wireless operator using an appropriate backhaul network 124 (typically, a public wide area network such as the Internet).

Although FIG. 1 (and the description set forth below more generally) is described in the context of a 5G embodiment in which each logical base station entity 102 is partitioned into a CU 108, DUs 110, and RUs 109 and, for at least some of the physical channels, some physical-layer processing is performed in the DUs 110 with the remaining physical-layer processing being performed in the RUs 109, it is to be understood that the techniques described here can be used with other wireless interfaces (for example, 4G LTE) and with other ways of implementing a base station entity (for example, using a conventional baseband band unit (BBU)/ remote radio head (RRH) architecture). Accordingly, references to a CU, DU, or RU in this description and associated figures can also be considered to refer more generally to any entity (including, for example, any "base station" or "RAN" entity) implementing any of the functions or features described here as being implemented by a CU, DU, or RU.

Each CU 108, DU 110, and RU 109, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.).

Moreover, each CU 108, DU 110, and RU 109, can be implemented as a physical network function (PNF) (for example, using dedicated physical programmable devices and other circuitry) and/or a virtual network function (VNF) (for example, using one or more general purpose servers (possibly with hardware acceleration) in a scalable cloud environment and in different locations within an operator's network (for example, in the operator's "edge cloud" or "central cloud"). Each VNF can be implemented using hardware virtualization, operating system virtualization (also referred to as containerization), and application virtualization as well as various combinations of two or more the preceding. Where containerization is used to implement a VNF, it may also be referred to as a "containerized network function" (CNF).

For example, in the exemplary embodiment shown in FIG. 1, each RU 109 is implemented as a PNF and is deployed in or near a physical location where radio coverage is to be provided and each CU 108 and DU 110 is implemented using a respective set of one or more VNFs deployed in a distributed manner within one or more clouds (for example, within an "edge" cloud or "central" cloud).

Each CU 108, DU 110, and RU 109, and any of the specific features described here as being implemented thereby, can be implemented in other ways. In the exemplary embodiment shown in FIG. 1, each base station 102 is coupled to a distributed antenna system (DAS) 130 in order to improve the wireless coverage provided by the base station 102.

In the exemplary embodiment shown in FIG. 1, each base station 102 is coupled to a distributed antenna system (DAS) 130 in order to improve the wireless coverage provided by the base station 102. More specifically, in the exemplary embodiment shown in FIG. 1, an RU 109 of each base station 102 is coupled to the DAS 130 using an analog RF interface. More specifically, the DAS 130 is coupled to the set of antenna ports 111 of the RU 109 that would otherwise be used to couple the RU 109 to a set of antennas. The connection between the base station 102 and the DAS 130, in this example, may occur using one or more coaxial cables and possibly some intermediary attenuators or a point-of-interface (POI) type device connecting the antenna ports 111 of the RU 109 to antenna ports 132 of a master unit (MU) 135 of the DAS 130

In an example DAS 130, radio frequency (RF) signals may be transported between a master unit 135 and one or more RAU 140 using one or more transport cables 136, that are part of the fronthaul of the communication system 100. The transport cables 136 may be part of a fiber distribution network.

Traditionally, RF signals transmitted from the base stations 102 (also referred to here as "downlink RF signals") are received at the master unit 135. The master unit 135 uses the downlink RF signals to generate one or more downlink transport signals that are distributed to one or more of the RAUs 140 over the transport cables 136. Each such RAU 140 receives a downlink transport signal and generates a version of the downlink RF signals based on the downlink transport signal and causes the generated downlink RF signals to be radiated from at least one antenna 144 coupled to or included in that RAU 140.

A similar process is performed in the uplink direction. RF signals transmitted are from user equipment 150 (also referred to here as "uplink RF signals"). Each such uplink RF signal is intended for a base station 102 coupled to the master unit 135. Each RAU 140 receives uplink RF signals transmitted from user equipment 150 within its associated coverage area. Each RAU 140 uses the received uplink RF signals to generate an uplink transport signal that is transmitted from the RAU 140 to the master unit 135. The MU 135 receives uplink transport signals from the various RAUs 140 coupled to it. An extension unit (EU) 138 may be used between the MU 135 and one or more RAU 140 to extend the coverage of the DAS 130.

For each base station 102 coupled to the master unit 135, the master unit 135 ultimately generates uplink RF signals from the combined uplink signals for that base station 102, which are provided to that base station 102. Each RAU 140 can be coupled to each master unit 135 either directly or indirectly via one or more intermediate devices (such as another RAU 140 or an expansion unit (EU) 138). In this way, the coverage of each base station 102 can be expanded using the DAS 130. In one example, a master unit 135 of the DAS 130 is in communication with (or coupled to) the antenna ports 111 of the RUs 109 as discussed above.

Although in the exemplary embodiment shown in FIG. 1 each base station 102 is coupled to a DAS 130, it is to be understood that the techniques described below can be used with a base station 102 that is not connected to a DAS 130. For example, the techniques described below can also be a base station 102 that is not connected to a DAS 130 but is implemented using a so-called "non-ideal" fronthaul network. As used here, a "non-ideal" fronthaul network is one that may not always be able to satisfy the minimum bandwidth and/or latency requirements for the base station 102 that would otherwise be necessary if the techniques described below were not used.

As discussed above, example embodiments of the base station 102 may use Ethernet switching in communications between service provider's core network 122 and the UEs 150 through the extended distribution network provided by the DAS 130. The use of Ethernet switching adds latency due to the handling of the Ethernet frames that includes reconceiving the Ethernet frame, buffering the Ethernet frame and forwarding the Ethernet frame.

As described above, specific features described here as being implemented thereby, can be implemented in hardware, software, or combinations of hardware and software. In one example the circuitry of the DU 110 described above provides specific functions including control of the Ethernet switching function and frame boundaries as discussed in detail below. Such functions may include the functions of processing RACH independently from PUSCH and other channels to reduce latency while maintaining QoS and implementing the Ethernet switching. The circuitry of the DU 110 of the base station 102 is further configured to detection communication signals in the RACH, PUSCH and other communication channels.

Figure 2:
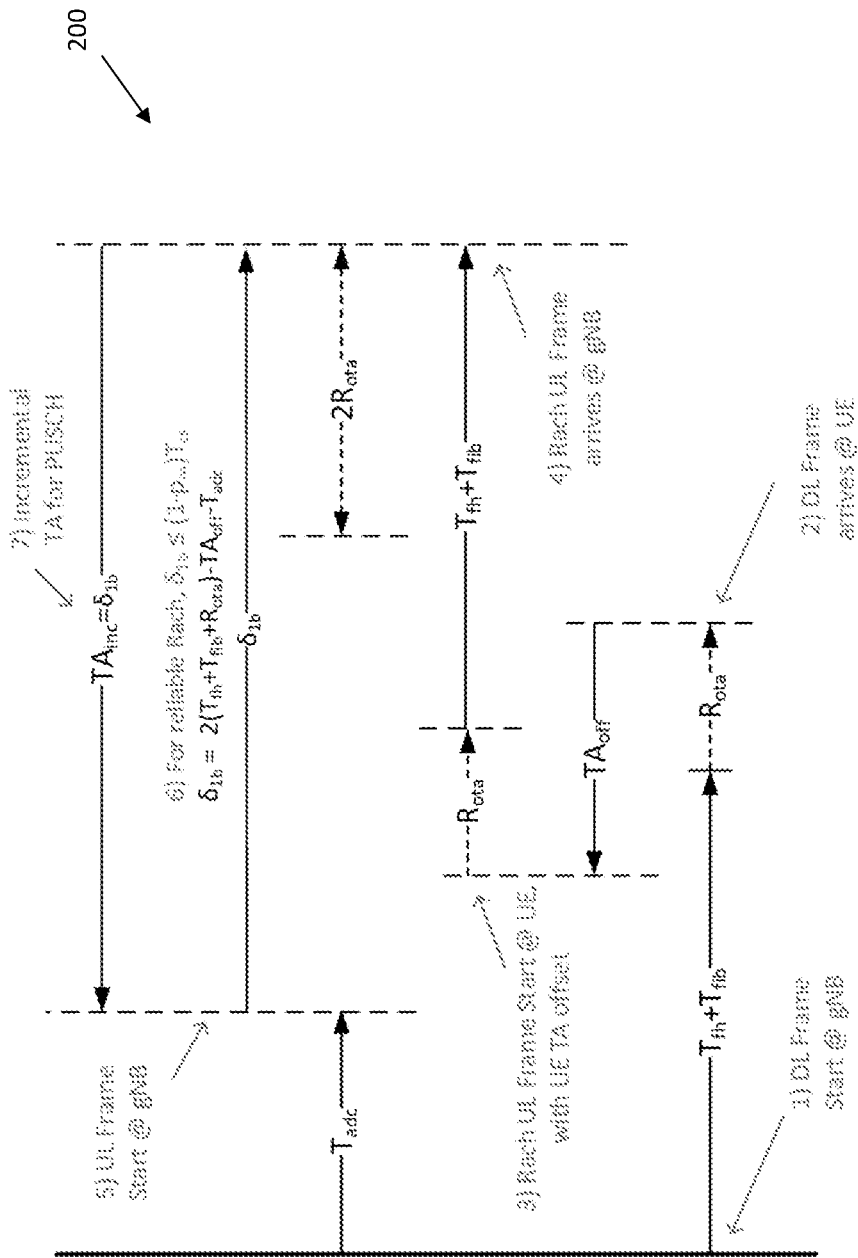
FIG. 2 illustrates latency table that uses the same RACH and PUSCH UL frame boundary of the prior art.

As discussed above, latency in the communication system 100 has implications. The first implication relates to RACH performance. Latency table 200 of FIG. 2 illustrates the relationship among latencies, ADC, timing advance (TA), and $T_{cs}$ when the base station uses the same UL frame boundary for RACH and PUSCH. A base station 102 will establish a transmit DL frame boundary shown on the far left. The base station 102 will also establish the UL frame start boundary (shared for Rach and for PUSCH) which may be delayed from the DL frame boundary by $T_{adc}$. Normally $T_{adc}$ is set to zero otherwise PUSCH performance is degraded in TDD systems. The effective latency in the system is the round-trip delay through the fronthaul plus round trip over the OTA, minus $T_{adc}$ minus the timing advance offset $TA_{off}$. The effective latency has to be smaller than the time $T_{cs}$ between RACH cyclic shifts. When the UE 150 tries to connect using RACH, the UE 150 will randomly pick one root-sequence and one cyclic shift from among the set of root-sequences and cyclic shifts that have been prescribed in the base station's system information block (SIB). The more cyclic shifts that are available for each root-sequence, the smaller the value for $T_{cs}$. A base station 102 needs to reconcile the latency. The effective latency has to be less than or equal to the time between cyclic shifts so the base station 102 is able to detect the actual cyclic shift used by the UE 150. Otherwise, the UE 150 will not be able to connect. If the RACH receive frame is on the same frame boundary used for PUSCH, a large value for $T_{cs}$ is generally required to fit the latency within $T_{cs}$.

For reliable RACH performance, the latency has to be less than or equal to the time between cyclic shifts times a fractional margin allocation to account for channel delay spread and synchronization error as shown in equation 6 of FIG. 2 which is described below. For the aforementioned prescription of the set of root sequences and cyclic shifts made in SIB, it is required that the total number of available preambles is 64. The total number of preambles available is the product of the number of root-sequences times the number of cyclic shifts per root sequence. A relatively large value for $T_{cs}$ associated with a relatively small number of cyclic shifts per sequence, and thus a relatively large number of root sequences. So, one consequence of high latency (requiring high $T_{cs}$) is that the base station must prescribe a correspondingly large number of root-sequences. Both the computational complexity required by the base station for processing RACH, and the RACH false alarm rate experienced, are relatively large for a relatively large number of root-sequences. Further, a large latency also limits the fiber reach that can be used. Basically, the amount of latency that can be accommodated in the communication system is limited by the value of $T_{cs}$ that is chosen.

Referring to the prior art FIG. 2, if latency is high in the fronthaul (including through the fiber cables 136 of the fiber distribution network) between the base station 102 and the RAUs 140, a nonzero antenna delay compensation ($T_{adc}$) in the base station 102 and nonzero timing advance offset ($TA_{off}$) for the UE 150 can be configured to reduce the value required for $T_{cs}$, and as mentioned previously using $T_{adc} > 0$ degrades PUSCH performance.

Assuming the transport cables 136 are fiber cables that are spooled, as necessary, or data buffering is implemented in the RAUs so that the latency between a MU 135 of the DAS 130 and a RAU 140 is the same for all RAU 140, when the RACH and PUSCH share frame boundaries, then $T_{fh}$ and $T_{fib}$ represents the one-way latencies for the fronthaul and fiber distribution respectively and $R_{ota}$ represents the maximum one-way over-the-air propagation time (reach) to a UE 150 from a RAU 140. In the prior art latency table, the DL frame boundary arrives at the most distant UE 150 a time $T_{fh}+T_{fib}+R_{ota}$ after departing the base station 102. Without loss of generality in what follows the departure time is 0. A UE 150 attempting RACH will start its transmission at time $T_{fh}+T_{fib}+R_{ota}-TA_{off}$ and the start of the transmission arrives at the base station 102 at time $2(T_{fh}+T_{fib}+R_{ota})-TA_{off}$.

As indicated above, in the prior art FIG. 2, the base station 102 uses the same UL frame boundary for PUSCH and RACH. With configuration $T_{adc}$ for antenna delay compensation, this common UL frame boundary occurs at time $T_{adc}$, so there is time $$\delta_{1b}=2(T_{fh}+T_{fib}+R_{ota})-TA_{off}-T_{adc} \quad (1)$$

between the UL frame boundary and the RACH arrival at the base station 102. It is required that $$\delta_{1b} \leq (1-p_m)T_{cs} \quad (2)$$

for the base station 102 to reliably determine the RACH cyclic shift used by the UE 150, where $T_{cs}$ is the time between cyclic shifts and $p_m \leq 1$ is a fractional margin allocated for e.g., channel delay spread and synchronization error. The annotation "1b" in $\delta_{1b}$ is used to distinguish the current analysis for a common RACH/PUSCH frame boundary, from an analysis for two separate boundaries discussed below. The value for $T_{cs}$ is determined by the zero-correlation-zone (ZCZ) configuration and the RACH subcarrier spacing (SCS) which are part of the RACH prescription in SIB mentioned earlier.

Given $T_{cs}$, substituting equation (2) into equation (1), and rearranging it is found that for the permissible fiber latency, $$T_{fib} \le (TA_{off} + (1-p_m)T_{cs} + T_{adc})/2 - (T_{fh} + R_{ota}). \quad (3)$$

Upon RACH detection, the base station 102 provides an incremental timing advance directive $TA_{inc}$ for the UE 150, to be used on top of $TA_{off}$, to align reception of the UE's 150 subsequent PUSCH and other UL transmissions with the UL frame boundary at the base station 102. As also shown in FIG. 2, $TA_{inc} = \delta_{1b}$, and using equation (1) the net timing advance for the UE 150 is $$TA_{tot} = TA_{off} + \delta_{1b} = 2(T_{fh} + T_{fib} + R_{ota}) - T_{adc}. \quad (4)$$

If fiber length is maximized, equation (2) holds with equality, and we have $$TA_{tot} = TA_{off} + (1-p_m)T_{cs}. \quad (5)$$

It is noted from equations (3) and (5) that both the fiber length supported, and the corresponding net TA required, increase with $TA_{off}$ and $T_{cs}$. Antenna delay compensation has no impact on net timing advance (at maximum fiber length), and improves fiber length support. However, ADC introduces overlap between the DL TX frame and the UL Rx frame at the base station 102, which can impact PUSCH performance for TDD.

In a slot containing the TDD transition from DL to UL, transmissions do not occur in a configured number $N_g$ of guard (PUSCH) symbols, to provide time for the UE's AFE to transition from reception to transmission. Let $T_g$ denote the time associated with the $N_g$ guard symbols and let $T_g' \le T_g$ denote the actual worst-case guard time required by a UE 150. At the transition from DL to UL, a UE's UL transmission start time is advanced by $TA_{tot}$, which affectively reduces $T_g$ by $TA_{tot}$. So for the UL performance not to be degraded at the DL/UL transition, it is required that $T_g - TA_{tot} \ge T_g'$, or equivalently, $$TA_{tot} \le T_g - T_g'. \quad (6)$$

From equation (2), we already require $$TA_{tot} \le TA_{off} + (1-p_m)T_{cs} \quad (7)$$

for reliable RACH performance. Let $$\tau = \text{Min}\{T_g - T_g', TA_{off} + (1-p_m)T_{cs}\}, \quad (8)$$

apply both the requirements of equations (6) and (7) into equation (4), and reorder terms to arrive at $$T_{fib} = (\tau + T_{adc})/2 - (T_{fh} + R_{ota}) \quad (9)$$

for the maximum fiber latency permitting both reliable RACH performance and nondegraded UL performance at the DL/UL transition. The fiber reach is limited by the maximum possible configuration for $TA_{off} + (1-p_m)T_{cs}$, i.e., by equation (3).

In embodiments of the invention, the RACH and PUSCH do not share frame boundaries. As illustrated in the latency table 300 that uses different RACH and PUSCH UL frame boundary of FIG. 3, a delay $D_{rach}$ is used to delay the RACH uplink frame from the PUSH UL frame. D rac h is the known latency through the fronthaul (which includes the fiber distribution network made up of cables 136). By removing the latency related with the fronthaul, the determination of the cyclic shift that is permissible is only associated with the over the air latency influences. This allows for the use of smaller cyclic shifts which results in less root sequences which in turn results in less processing and better RACH performance.

As seen in equations (1) and (2) discussed above, with UL RACH and PUSCH boundaries aligned at the base station 102, the value required for $T_{cs}$ in general increases with fronthaul (FH) latency $T_{fh}$ and fiber latency $T_{fib}$. Relatively large $T_{cs}$ implies a ZCZ with a relatively small number of cyclic shifts and correspondingly large number of root-sequences per RACH opportunity. RACH performance generally degrades somewhat, and processing complexity increases, as the number of root sequences increases. The performance degradation is due to the relatively high false-alarm rate implied by a relatively large number of root sequences.

As the PUSCH and RACH signals are processed independently at the base station 102, the base station 102 can delay its UL RACH boundary relative to its PUSCH boundary. Let $D_{rach}$ denote this delay. As show in the latency table 300 of separate RACH and PUSCH UL frame boundaries of FIG. 3, by using a value $$D_{rach} = 2(T_{fh} + T_{fib}) - TA_{off} - T_{adc}, \quad (10)$$

$\delta_{1b}$ in (2) is reduced to $$\delta_{2b} = 2R_{ota}, \quad (11)$$

with requirement $$\delta_{2b} \le (1-p_m)T_{cs} \quad (12)$$

for reliable RACH detection. By using the value of equation (10) the dependence of $T_{cs}$ on $T_{fh}$ and $T_{fib}$ is eliminated, so from the perspective of RACH performance, effectively $T_{fib} = \infty$ is possible, independent of the values for other system variables. Furthermore, a minimal value for $T_{cs}$ can be used based on OTA considerations only, independent of the latencies in the FH and fiber distribution network.

Figure 3:
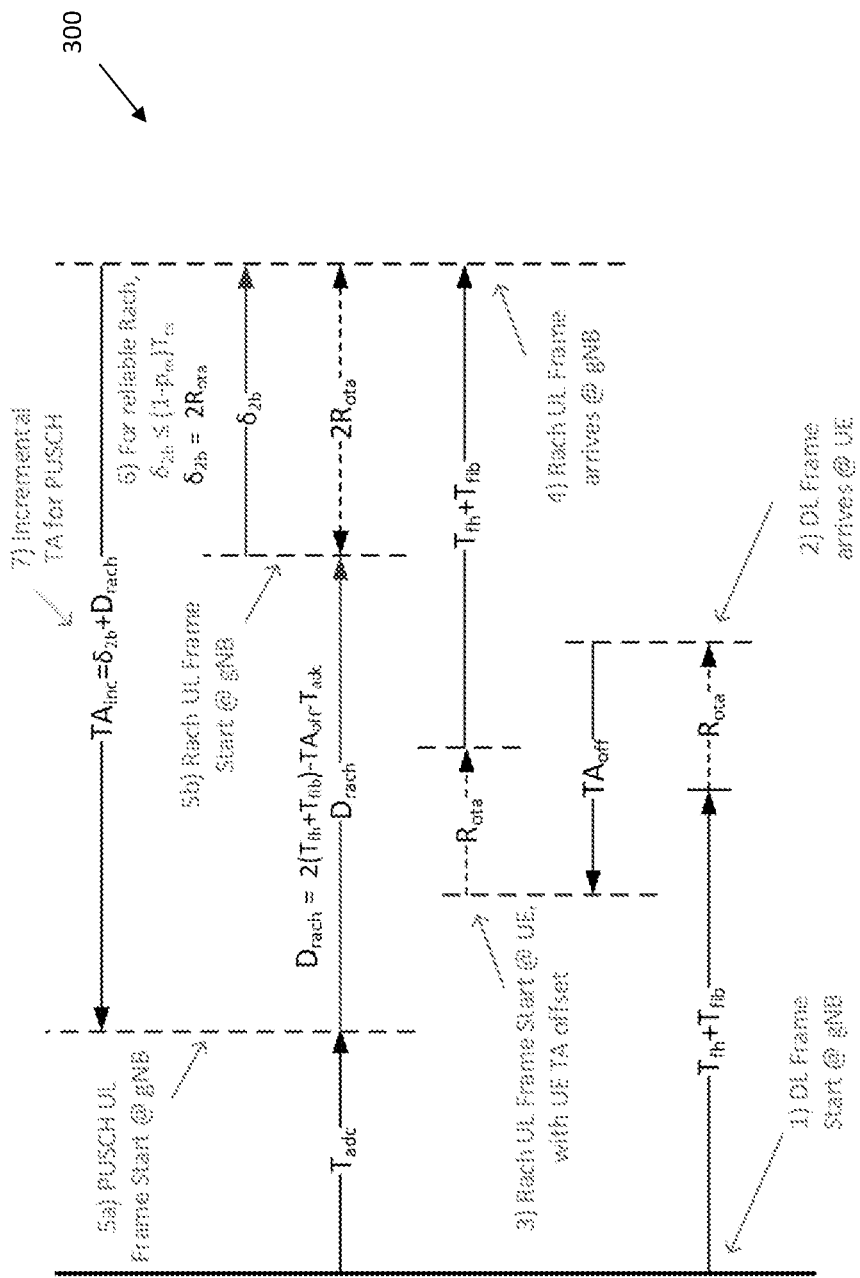
FIG. 3 illustrates latency table that uses different RACH and PUSCH UL frame boundary according to an example aspect of the present invention.

Net TA does depend on fiber length however as illustrated in FIG. 3, the incremental TA is $$TA_{inc} = \delta_{2b} + D_{rach},$$

so $$TA_{tot} = TA_{off} + \delta_{2b} + D_{rach} = 2(T_{fh} + T_{fib} + R_{ota}) - T_{adc}, \quad (13)$$

which is the same as the net TA of equation (4) for the common frame boundary. With a constraint on $TA_{tot}$, equation (13) can be solved for the max permissible fiber latency as $$T_{fib} = (TA_{tot} + T_{adc})/2 - (T_{fh} + R_{ota}). \quad (14)$$

For nondegraded UL performance at the DL/UL transition, we have the same constraint on $TA_{tot}$ as developed in equation (6) for a common frame boundary. Using equation (6) with equality in equation (14) we have $$T_{fib} = (T_g - T_g' + T_{adc})/2 - (T_{fh} + R_{ota}) \quad (15)$$

for the maximum fiber latency supported with separate frame boundaries. Comparing equation (15) with equations (8) and (9) we see that the fiber latency supported is the same for common/separate frame boundaries only if, for a common frame boundary, $TA_{off} + (1-p_m)T_{cs}$ can be configured equal to $T_g - T_g'$ otherwise fiber support is greater for separate frame boundaries. Furthermore, with separate frame boundaries, fiber support is not limited by $TA_{off} + (1-p_m)T_{cs}$, as in equations (8) and (3) for a common frame boundary.

As illustrated in FIGS. 2 and 3, when $T_{adc} > 0$ is used, an overlap of $T_{adc}$ is introduced at the base station 102 between the start of the DL frame and the tail of the UL frame. A consequence for an RF donor using TDD, is that the length-T ads tail portion of the UL signal reception is corrupted by echo starting from the time the base station begins transmission at the Tx frame boundary.

The sensitivity of PUSCH performance to $T_{adc}$ increases with code rate, as a relatively high code rate implies fewer redundant bits are available to mitigate what amounts to impulse noise introduced at the end of the PUSCH arrival. The UE 150 experiences a reduction in its max attainable TP. This reduction for a given constellation size can be quantified by first evaluating BLER for initial transmissions, with SNR=Inf, as code rate is increased gradually. Upon the BLER first exceeding 10 percent, the prior code rate is taken as link adaptation (LA) code rate, and the LA code rate is converted to TP (in b/RE) for the UE 150. The conversion is based on the constellation size, the code rate, and the sequence of N/ACKs, counting successful first transmissions and successful retransmissions toward TP. In an example, the TDD configuration is 4:1, with PUSCH occupying all 14 symbols of the UL slot. The base station 102 has two antennas for reception, and the UE 150 transmits one SM stream UL using one antenna.

Referring to FIG. 4, an UL communication flow diagram 400 of one example embodiment is provided. The UL communication flow diagram 400 is provided as a series of sequential block. The sequency of the blocks may occur in a different order or even in parallel in other embodiments. Hence, embodiments are not limited to sequential order of the blocks illustrated in FIG. 4.

The UL communication flow diagram 400 starts a block (402) where the base station 102 monitors the communication channels for an UL RACH communication signals. If an UL communication signal is not detected at block (404), the process continues monitoring at block (402). Upon detection of a RACH preamble, the base station provides the UE 150, that generated the UL RACH communication signal, a timing advance (TA) command through a DL communication that accounts for a roundtrip latency at block (406). The roundtrip latency may include the roundtrip latency in a fronthaul network connecting the base station 102 and RAU 104 (radio units). Subsequent UL communication signals from the UE 150 based on the TA command, cause the reception of the UE's subsequent UL communications, including subsequent PUSCH and other transmissions to be aligned with the PUSCH frame boundary. The communication signals in the PUSCH are processed independently at block (408). The process then continues at block (402) monitoring for UL communication signals.

Further, a select delay from the UL PUSCH time frame boundary for the communication signals in the PUSCH is set at block (410). A delayed UL RACH time frame boundary is set at block (412) at a select delay from an associated RACH time frame boundary within a UL PUSCH time frame. The delay may be based on a latency in the fronthaul of the communication system 100. In one example, the latency is equal to the latency in the fronthaul of the communication system 100. The fronthaul includes communications paths (fiber network) between the base station 102 and the RAUs 140 that, in an example, includes fiber cables 136 between the MU 135 and the RAUs 140. The communication signals in the RACH are then processed at block (414). The processing may include looking for preambles in the UL communication signals. The process then continues by monitoring for UL signals at block (402).

EXAMPLE EMBODIMENTS

Example 1 is a method of operating a communication system with dual base station frame boundaries is provided. The method includes setting an uplink (UL) physical uplink shared channel (PUSCH) time frame boundary at a base station aligned with a downlink (DL) physical downlink shared channel (PDSCH) time frame boundary; processing PUSCH communication signals in the PUSCH based on the UL PUSCH time frame boundary; setting an UL random access channel (RACH) time frame boundary at a select delay from an associated RACH time frame boundary within a UL PUSCH time frame; processing RACH communication signals based on the delayed UL RACH time frame boundary, wherein the processing of RACH communication signals is independent of the processing of PUSCH communication signals; and upon detection of a RACH preamble, providing a timing advance command to a user equipment (UE) that communicated a UL communication signal that accounts for a round trip latency so subsequent UL communications from the UE will be aligned with the UL PUSCH time frame boundary.

Example 2 includes the method of Example 1, wherein the select delay is based on a latency through a fronthaul of the communication system.

Example 3 includes the method of any of the Examples 1-2, wherein the fronthaul includes a fiber distribution network.

Example 4 includes the method of Example 2, wherein the fronthaul includes communications between a base station and remote antenna units of the communication system.

Example 5 includes the method of any of the Examples 1-4, wherein processing RACH communication signals further includes detecting RACH preambles in the RACH communication signals.

Example 6 includes a program process comprising a non-transitory processor-readable medium on which program instructions configured to be executed by at least one communication controller are embedded, wherein when execute by the communication controller, the program instructions cause the communication controller to: set an UL physical uplink shared channel (PUSCH) time frame boundary at a base station aligned with a downlink (DL) physical downlink shared channel (PDSCH) time frame boundary; process PUSCH communication signals in the PUSCH based on the UL PUSCH time frame boundary; set an UL RACH time frame boundary at a select delay from an associated RACH time frame boundary within a UL PUSCH time frame, wherein the select delay is based on a round trip latency through a fronthaul of a communication system connecting a base station with antennas; and process RACH communication signals based on the delayed UL RACH time frame boundary, wherein the processing RACH communication signals is independent of the processing PUSCH communication signals; and upon detection of a RACH preamble, provide a timing advance command to user equipment (UE) that communicated the UL RACH communication signal that accounts for a round trip latency so subsequent UL communications from the UE will be aligned with the UL PUSCH time frame boundary;

Example 7 includes the program product of Example 6, wherein the fronthaul includes a fiber distribution network.

Example 8 includes the program product of any of the Examples 6-7, wherein the fronthaul includes communications between a base station and remote antenna units of the communication system.

Example 9 includes the program product of any of the examples 6-8, wherein the processing RACH communication signals further includes detecting RACH preambles in the RACH communication signals.

Example 10 includes a base station of a communication system that uses dual base station frame boundaries. The base station includes circuitry configured to wirelessly communicate with user equipment (UE). The circuitry is configured to: set an UL physical uplink shared channel (PUSCH) time frame boundary at a base station aligned with a downlink (DL) physical downlink shared channel (PDSCH) time frame boundary; process PUSCH communication signals in the PUSCH using the UL PUSCH time frame boundary; set an UL random access channel (RACH) time frame boundary at a select delay from an associated RACH time frame boundary within a UL PUSCH time frame; process RACH communication signals using the delayed UL RACH time frame boundary, wherein the processing RACH communication signals is independent of the processing PUSCH communication signal; and upon detection of a RACH preamble, provide a timing advance command to a UE that communicated the UL RACH communication signal that accounts for a round trip latency so subsequent UL communications from the UE will be aligned with the UL PUSCH time frame boundary.

Example 11 includes the base station of Example 10, further including a distribution unit (DU) that is configured to implement time critical layer two functions at least some layer one functions for the base station. The circuitry is part of the DU.

Example 12 includes the base station of any of the Examples 10-11, further including at least one radio unit (RU). The RU of the base station is in communication with at least one master unit of a distributed antenna system (DAS). The at least one base station is further in communication with a core network of at least one service provider.

Example 13 includes the base station of Example 12, wherein the DAS includes at least one remote antenna unit (RAU), each RAU in communication with the at least one master unit with transport cables, the at least one RAU configured to be in wireless communication with the user equipment.

Example 14 includes the base station of Example 13, wherein the transport cables are fiber optic cables forming a fiber distribution network.

Example 15 includes the base station of Example 12, wherein each RU includes at least one antenna port.

Example 16 includes the base station of any of the Examples 10-15, further including a central unit (CU) to implement layer three and non-time critical functions for the base station.

Example 17 includes the base station of any of the Examples 10-16, wherein the select delay is equal to a latency through a fronthaul of the communication system.

Example 18 includes the base station of Example 17, wherein the fronthaul includes a fiber distribution network.

Example 19 includes the base station of Example 17, wherein the fronthaul includes communication components between a distribution unit of the base station and remote antenna units of the communication system.

Example 20 includes the base station of any of the Examples 10-17, wherein processing RACH communication signals includes detecting RACH preambles in the RACH communication signals.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of operating a communication system with dual base station frame boundaries, the method comprising:
    setting an uplink (UL) physical uplink shared channel (PUSCH) time frame boundary at a base station aligned with a downlink (DL) physical downlink shared channel (PDSCH) time frame boundary;
    processing PUSCH communication signals in the PUSCH based on the UL PUSCH time frame boundary;
    setting an UL random access channel (RACH) time frame boundary at a select delay from an associated RACH time frame boundary within a UL PUSCH time frame;
    processing RACH communication signals based on the delayed UL RACH time frame boundary, wherein the processing RACH communication signals is independent of the processing of PUSCH communication signals; and
    upon detection of a RACH preamble, providing a timing advance command to a user equipment (UE) that communicated a UL RACH communication signal that accounts for a round trip latency so subsequent UL communications from the UE will be aligned with the UL PUSCH time frame boundary.

2. The method of claim 1, wherein the select delay is based on a latency through a fronthaul of the communication system.

3. The method of claim 2, wherein the fronthaul includes a fiber distribution network.

4. The method of claim 2, wherein the fronthaul includes communications between a base station and remote antenna units of the communication system.

5. The method of claim 1, wherein processing RACH communication signals further comprises:
    detecting RACH preambles in the RACH communication signals.

6. A program product comprising a non-transitory processor-readable medium on which program instructions configured to be executed by at least one communication controller are embedded, wherein when execute by the communication controller, the program instructions cause the communication controller to:
    set an UL physical uplink shared channel (PUSCH) time frame boundary at a base station aligned with a downlink (DL) physical downlink shared channel (PDSCH) time frame boundary;
    process PUSCH communication signals in the PUSCH based on the UL PUSCH time frame boundary;
    set an UL RACH time frame boundary at a select delay from an associated RACH time frame boundary within a UL PUSCH time frame, wherein the select delay is based on a round trip latency through a fronthaul of a communication system connecting a base station with antennas;
    process RACH communication signals based on the delayed UL RACH time frame boundary, wherein the processing RACH communication signals is independent of the processing PUSCH communication signals; and
    upon detection of a RACH preamble, provide a timing advance command to user equipment (UE) that communicated the UL RACH communication signal that accounts for a round trip latency so subsequent UL communications from the UE will be aligned with the UL PUSCH time frame boundary.

7. The program product of claim 6, wherein the fronthaul includes a fiber distribution network.

8. The program product of claim 6, wherein the fronthaul includes communications between a base station and remote antenna units of the communication system.

9. The program product of claim 6, wherein the processing RACH communication signals further comprises:
   detecting RACH preambles in the RACH communication signals.

10. A base station of a communication system that uses dual base station frame boundaries, the base station comprising:
    circuitry configured to wirelessly communicate with user equipment (UE), wherein the circuitry is configured to:
       set an UL physical uplink shared channel (PUSCH) time frame boundary at a base station aligned with a downlink (DL) physical downlink shared channel (PDSCH) time frame boundary;
       process PUSCH communication signals in the PUSCH using the UL PUSCH time frame boundary;
       set an UL random access channel (RACH) time frame boundary at a select delay from an associated RACH time frame boundary within a UL PUSCH time frame;
       process RACH communication signals using the delayed UL RACH time frame boundary, wherein the processing RACH communication signals is independent of the processing PUSCH communication signal; and
       upon detection of a RACH preamble, provide a timing advance command to a UE that communicated the UL RACH communication signal that accounts for a round trip latency so subsequent UL communications from the UE will be aligned with the UL PUSCH time frame boundary.

11. The base station of claim 10, further comprising:
    a distribution unit (DU) configured to implement time critical layer two functions at least some layer one functions for the base station, the circuitry being part of the DU.

12. The base station of claim 10, further comprising:
    at least one radio unit (RU), the RU of the base station in communication with at least one master unit of a distributed antenna system (DAS), the at least one base station further in communication with a core network of at least one service provider.

13. The base station of claim 12, wherein the DAS includes at least one remote antenna unit (RAU), each RAU in communication with the at least one master unit with transport cables, the at least one RAU configured to be in wireless communication with the user equipment.

14. The base station of claim 13, wherein the transport cables are fiber optic cables forming a fiber distribution network.

15. The base station of claim 12, wherein each RU includes at least one antenna port.

16. The base station of claim 10, further comprising:
    a central unit (CU) to implement layer three and non-time critical functions for the base station.

17. The base station of claim 10, wherein the select delay is based on a latency through a fronthaul of the communication system.

18. The base station of claim 17, wherein the fronthaul includes a fiber distribution network.

19. The base station of claim 17, wherein the fronthaul includes communication components between a distribution unit of the base station and remote antenna units of the communication system.

20. The base station of claim 10, wherein processing RACH communication signals includes detecting RACH preambles in the RACH communication signals.

* * * * *